Dec. 3, 1929. C. W. DAKE 1,738,359
BALL BEARING
Filed Dec. 6, 1926 2 Sheets-Sheet 1
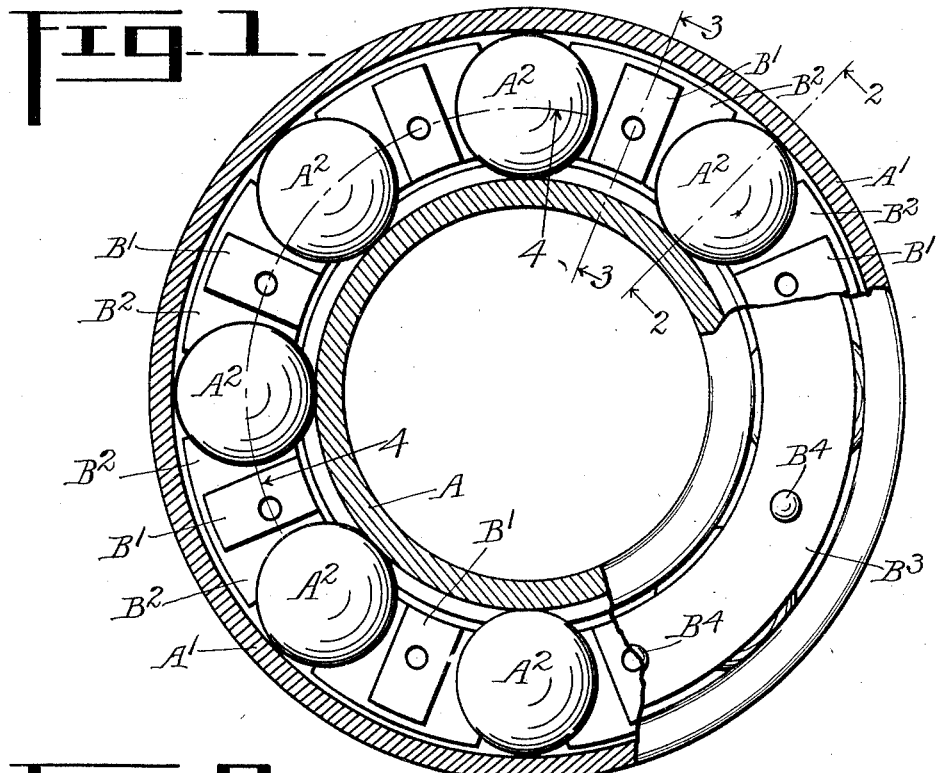
Fig. 1
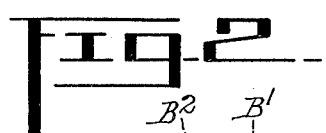
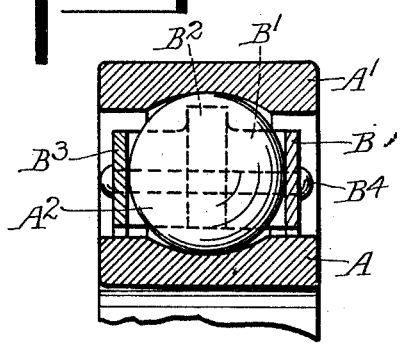
Fig. 2
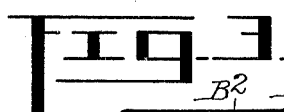
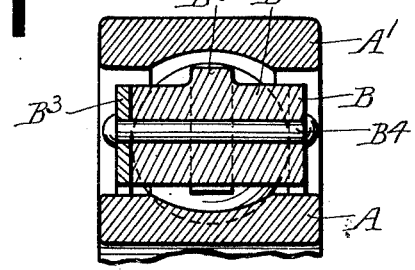
Fig. 3
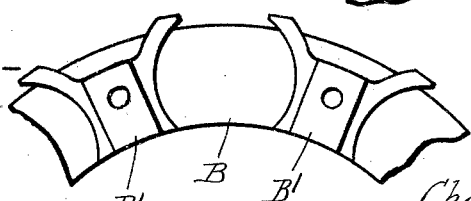
Fig. 8
INVENTOR
Charles W. Dake
BY
Parks a Carts
ATTORNEY

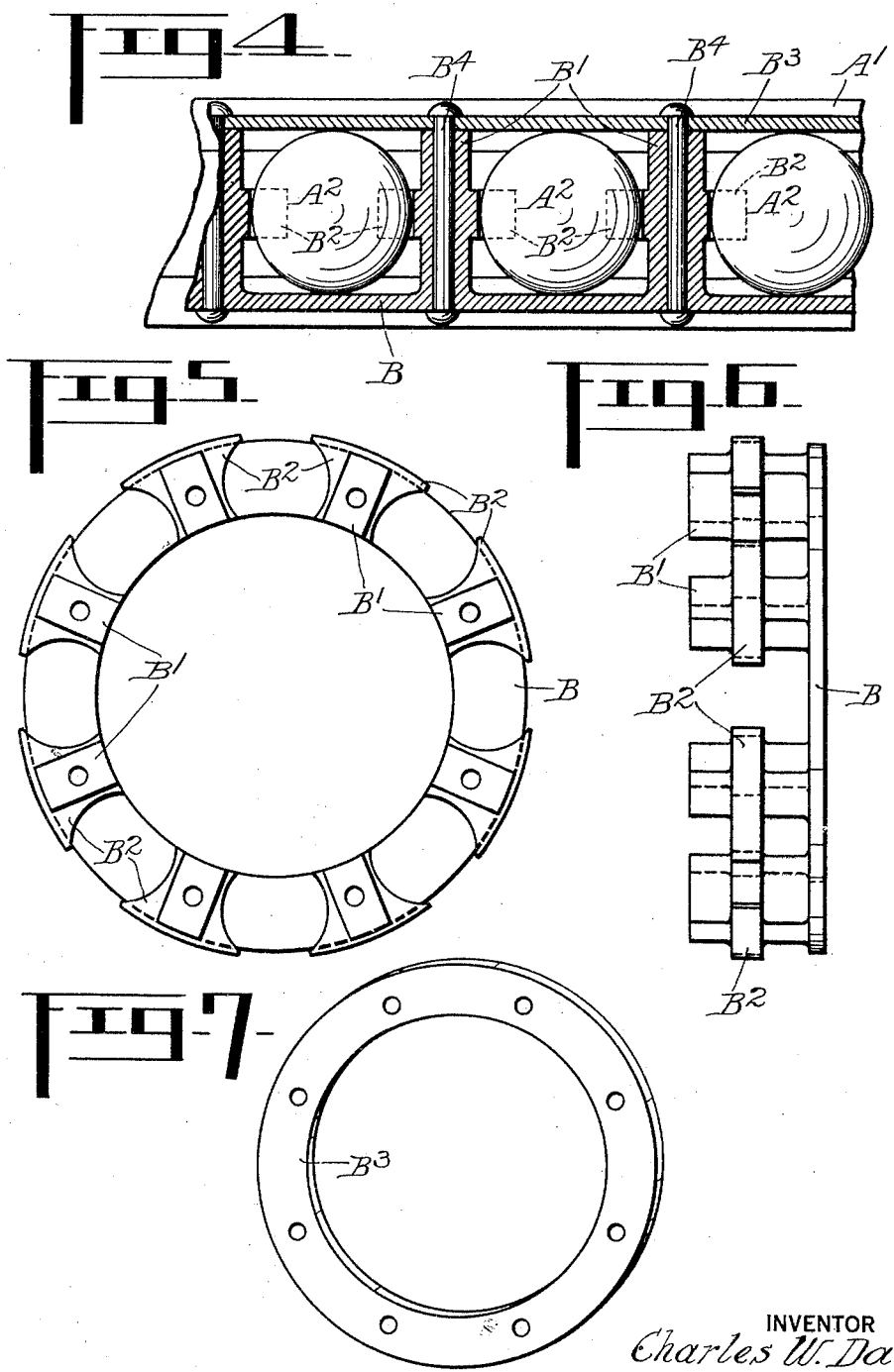

Patented Dec. 3, 1929

1,738,359

UNITED STATES PATENT OFFICE

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY

BALL BEARING

Application filed December 6, 1926. Serial No. 152,740.

My invention relates to improvements in ball bearings and has for one object to provide a new and improved spacer mechanism wherein gripping of the balls or other inaccuracies will have a minimum of effect on the life of the bearings and wherein there will be no wedging force interposed between the ball and the spacer. Other objects will appear from time to time throughout the specification and claims.

My invention is illustrated more or less diagrammatically in the accompanying drawings, wherein—

Figure 1 is a section in part elevation through a ball bearing in a plane perpendicular to the shaft;

Figure 2 is a section along line 2—2 of Figure 1 with the ball in elevation;

Figure 3 is a section along the line 3—3 of Figure 1;

Figure 4 is a section along the line 4—4 of Figure 1;

Figure 5 is a side elevation of the spacer ring;

Figure 6 is an edge elevation;

Figure 7 is a perspective of the ring cover;

Figure 8 is a side elevation of the modified form of spacer ring.

Like parts are indicated by like characters throughout.

A is the interior and $A^1$ the exterior ball race. $A^2$ is the bearing balls adapted to travel between said races and to support the load.

B is the spacer ring comprising an integral annular member adapted to be located at one side of the space between the ball races; projecting across this space in a direction parallel with the axis of rotation are a series of spacer blocks $B^1$ $B^1$, there being a block between each adjacent pair of balls. Projecting in opposite directions from the central portion of each block are the ball engaging wedges $B^2$ $B^2$ integral with the blocks $B^1$ and adapted to conform to the contour of the balls, the balls being held between opposed pairs of wedges and being thereby spaced about the periphery of the bearing. $B^3$ is the cover ring engaging the free ends of the spacer blocks $B^1$ in opposition to the ring B. $B^4$ $B^4$ are rivets extending through the spacer blocks $B^1$ and upset at either end in engagement with the rings B and $B^3$ to hold the parts together to form a rigid fixed spacing unit.

It will be noted that the ball races are grooved as indicated and in order to assemble them, it is necessary to permit all the balls to come together at one side when owing to the fact that on the opposed side, the races may approach more closely than the diameter of the ball, it is possible to assemble the balls with the races. After the balls are all in they can be spaced and then the filler blocks and ring inserted as a unit and the cover ring attached. It will be noted that this provides a separate box-like compartment for each ball. The balls may or may not be in contact with the parallel sided walls of the compartment formed by the rings B, $B^3$. It makes no difference because the spacing effect is produced by the engagement between the balls and the curved spacing wedging space and any movement or gripping of the ball will not in any way affect the relation between these two parallel walls and the ball thus cannot act as a wedging element to wreck the spacer.

In the modified form shown in Figure 8, the only difference is that the spacing blocks do not extend up quite so high and that the wedges take the form of curved arms. This is a lighter though of course weaker construction whose effect on the balls themselves is exactly the same as the effect of the preferred structure.

It is obvious that while the drawings show all the blocks integral with one of the rings, only, the same result would be obtained if some blocks were integral with one and some with the other as long as the two rings were held together with the blocks between them.

Another important feature is that when the balls are out of line, as they always are with an assembled ball gage instead of getting a true rolling bearing action, a spinning or gyrating action is set up which causes intense vibration at the very high speeds at which these generators operate and frequently destroys the machine.

I claim:

1. In a ball bearing, a spacer cage comprising a side ring, spacer blocks integral therewith and projecting inwardly therefrom between adjacent balls, a cover ring adapted to be held upon said blocks in opposition to the first mentioned ring and an integral bearing rib projecting from each block toward the opposed ball.

2. In a ball bearing, a spacer cage comprising a side ring, spacer blocks integral therewith and projecting inwardly therefrom between adjacent balls, a cover ring adapted to be held upon said blocks in opposition to the first mentioned ring and an integral bearing rib projecting from each block toward the opposed ball, said rib having a curved surface to conform to the contour of the ball.

3. In a ball bearing, a spacer cage comprising a side ring, spacer blocks integral therewith and projecting inwardly therefrom between adjacent balls, a cover ring adapted to be held upon said blocks in opposition to the first mentioned ring and an integral bearing rib projecting from each block toward the opposed ball, said rib being appreciably less in width than the diameter of the ball.

4. In a ball bearing, inner and outer ball races, bearing balls traveling between them, a spacer ring, a plurality of spacer blocks integral with the ring and projecting laterally from the ring between adjacent pairs of balls, integral ball engaging wedge abutments projecting from each block toward two opposed balls.

Signed at Chicago, county of Cook and State of Illinois, this third day of December, 1926.

CHARLES W. DAKE.